Patented Feb. 26, 1952

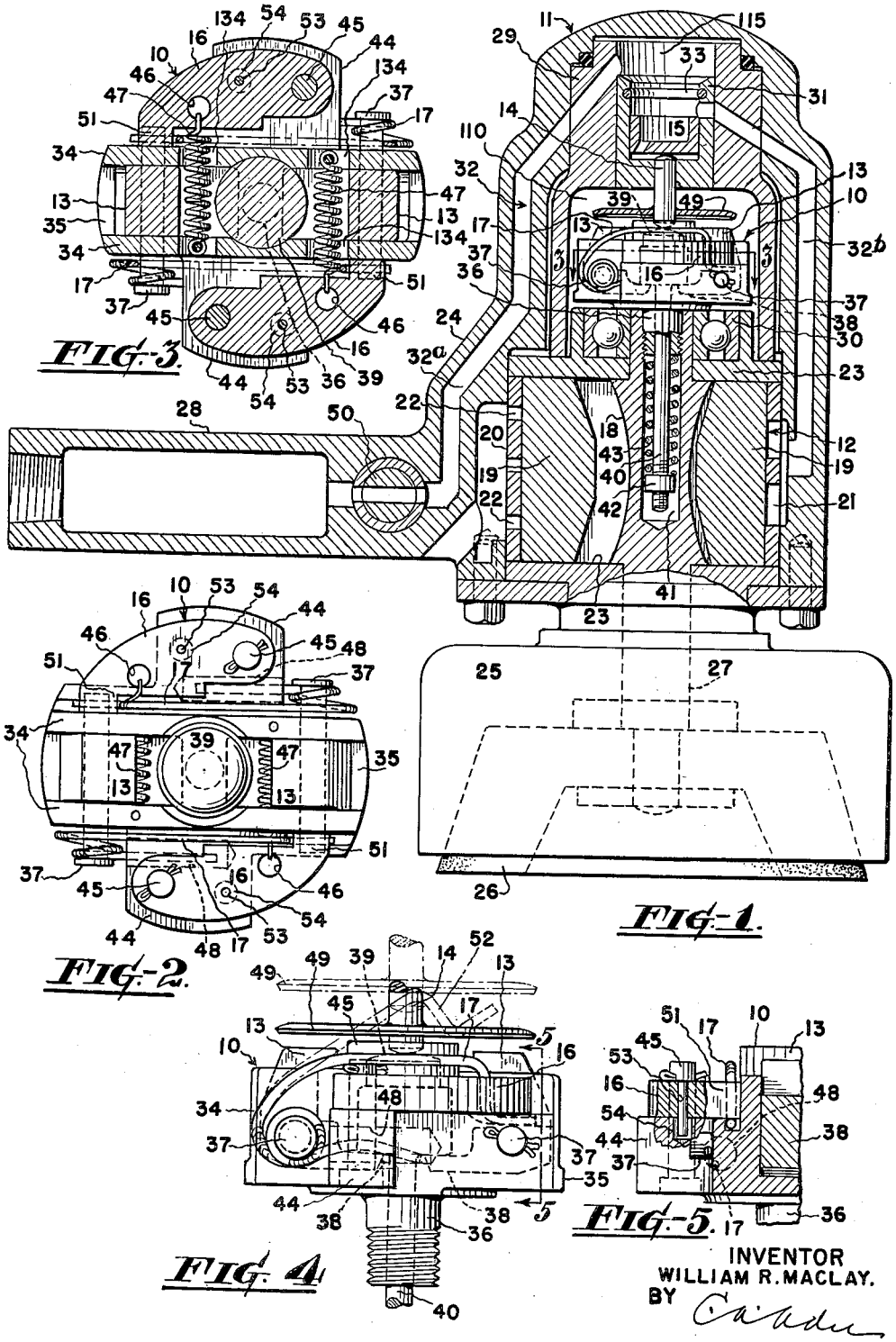

2,586,968

UNITED STATES PATENT OFFICE 2,586,968

SAFETY DEVICE FOR ROTARY MOTORS

William R. Maclay, Athens, Pa., assignor to Ingersoll-Rand Company, New York, N. Y., a corporation of New Jersey Application November 16, 1949, Serial No. 127,668

4 Claims. (Cl. 121—34)

1

This invention relates to governors, and more particularly to safety devices for rotary motors.

This invention is particularly adaptable to pneumatically operated tools such as surface grinders, and operates to shut down the grinder in the event of overspeed of the driving motor due to faulty operation of the speed governor. With this type of tool the motor runs unloaded periodically due to the mode of operation associated with surface grinders. As a result of this periodic loading and unloading of the motor, the governor parts are subject to excessive wear and fautly operation of the speed governor may result.

Inasmuch as surface grinders are normally designed to do work at high speed, an extremely dangerous condition is encountered in the event the speed governor fails to operate. That is, due to this high speed of the grinder when loaded, the grinder can, under the unloaded condition, reach a speed, if the speed governor fails to operate, at which the grinding wheel will be thrown apart due to centrifugal force.

It is accordingly one object of this invention to permanently shut down the motor in the event the speed governor fails to operate.

Another object is to provide a safety device that is simple in design and compact in construction.

Further objects will become apparent from the following specification and accompanying drawings in which, Figure 1 is a longitudinal vertical elevation of a surface grinder provided with a safety device constructed in accordance with the practice of the invention, Figure 2 is a top view of a speed governor and an overspeed governor, Figure 3 is a transverse view taken through Figure 1 along the line 3—3 looking in the direction of the arrows, Figure 4 is a side elevation of the speed governor and overspeed governor, and Figure 5 is a transverse view taken through Figure 4 along the line 5—5 looking in the direction of the arrows.

Refering to the drawings, the sped control governor and the overspeed govenor, indicated in their entirety by 10, are shown adapted to a conventional surface grinder 11 driven by an air motor 12. The speed governor is responsive to the speed of the motor 12 and serves to maintain the speed of the motor relatively constant by controlling the supply of the power to the motor 12. In furtherance to this end, movement

2 of fly-weights 13 of this governor is transmitted through a pin 14 to move a valve 15 for controlling the supply of power to the motor 12.

If, for any reason, the speed control governor fails to operate, fly-weights 16 of the overspeed governor will release springs 17 which, on their release, move the pin 14 to close the valve 15 whenever the speed of the motor 12 reaches some predetermined maximum value. With this arrangment then, a means is provided for controlling the speed of the grinder 11 and in the event of faulty operation of the speed governor, the overspeed governor comes into action to shut down the motor before it reaches some predetermined speed.

Referring in greater detail to the construction of the grinder, the motor 12 includes a rotor 18 in which are slidably mounted vanes 19 enclosed in a cylindrical housing 20. Air inlet and discharge ports 21 and 22, respectively, are provided in the housing 20, and end plates 23 enclose the opposite ends of the housing 20. The motor 12 is suitably housed in the lower portion (as viewed in Figure 1) of a casing 24 having a handle 28 integral therewith; and bolted to the lower end of the casing 24 is a shield 25 for a grinding wheel 26 secured to the motor spindle 27. The upper end portion of the rotor 18 extends through the plate 23 into the governor chamber 110 defined by a cylindrical member 29 press-fitted within the upper portion of the casing 24, and is journaled in a bearing 30 provided on the upper plate 23.

The bore of the upper portion of the member 29 is somewhat reduced in diameter and serves to define a valve chamber 115 for the valve 15. In furtherance to this end, there is fitted within the reduced bore a cup-shaped bushing 31 for the reception for the similarly shaped valve 15. Movement of the valve 15 to control the supply of power to the motor 12 is facilitated by the means of a pin 14 which extends through the bottom of the element 31 and bears against the bottom of the valve 15. Thus, longitudinal movement of the pin 14 is transmitted to the valve 15 to control the flow of compressed air through a passage 32 to the motor 12.

The passage 32 is divided into sections 32ᵃ and 32ᵇ by the chamber 115; the section 32ᵃ extends upstream of the chamber through the member 29, casing 24 and the handle 28 in which is provided a manually operable valve 50 for controlling the flow of air through this section 32ᵃ. The section 32ᵇ extends downstream of the chamber 115 through the bushing 31, member 29 and casing 24 to the inlet port 21, thus air flowing through the passage 32 to the motor must pass through the valve chamber wherein the flow of pressure fluid is controlled by valve 15. In furtherance to this end, the downstream end of the passage 32ª terminates in the valve chamber 115 on one side (the upper as viewed in Figure 1) of a valve stop, the ring 33 in the bushing 31, and the upstream end of the passage, or section, 32ᵇ terminates in the valve chamber 115 on the opposite side of the ring 33. Thus, movement of the valve 15 in the upward direction (as viewed in Figure 1) serves to reduce the flow of compressed air through the passage 32; and when the movement of the valve in this direction is halted by the ring 33, the lip, or upper edge, of the valve 15 is held in a sealing relation against the ring 33—which for this purpose is made of rubber—and the end of the passage 32ᵇ is completely covered by the valve 15 so that the supply of pressure fluid to the motor 12 is cut-off.

Movement of the pin 14 for actuating the valve 15 to regulate the speed of the motor 12 is attained by means of the speed governor comprising a pair of fly-weights 13 pivoted between a pair of parallel plates 34 mounted vertically on a horizontal plate 35 having a stem 36 threaded in the rotor 18. The fly-weights 13 are, in their preferred form, U-shaped and the lower legs thereof are pivoted on pins 37 which pass perpendicularly through the vertical plates 34 at the opposite end portions thereof. Extending inwardly from and integral with the lower legs of the fly-weights 13 are levers 38 the free ends of which underlie a head 39 on a rod 40 slidable in the stem 36 and extending into a recess, or central bore, 41 in the rotor 18. Threaded on the end of the rod 40 within the recess is a nut 42 which serves as a stop for one end of a spring 43, the other end of which bears against the end of the stem 36.

The spring 43 biased in this fashion, tends to hold the rod 40 in its lower limiting position and the head 39 at all times in contact with the levers 38. The length of the pin 14 is chosen such that when the rod 40 is in its lowermost position, the pin 14, the lower end of which rests on the head 39, permits the valve 15 to assume a position whereat the upper edge of the valve 15 lies in or slightly below a horizontal plane through the lowermost point of the end of the section 32ᵇ registering with the chamber 115. Thus slight upward movement of the pin 14 will cause the valve 15 to throttle the flow of pressure fluid to the motor 12.

With this arrangement, whenever the speed of the motor 12 reaches some predetermined value, the fly-weights 13 will swing outwardly moving the free ends of the levers 38 upwardly to lift the head 39 and move the pin 14 to actuate the valve 15 to throttle the flow of compressed air through the section 32ᵇ thereby preventing overspeeding of the motor 12. Whenever the speed of the motor falls to a value whereat the centrifugal force acting on the fly-weights 13 is not sufficient to overcome the force exerted on the rod 40 in the opposite direction by the spring 43, the rod 40 will be returned, by the spring 43, toward its lower limiting position thereby permitting the valve 15 to increase the flow of pressure fluid to the motor 12.

In the event of faulty operation of the speed governor, such that overspeeding of the motor 12 occurs, a situation that would arise in the event the fly-weights 13 stuck with the rod 40 in its lower limiting position, the overspeed governor comes into action to shut down the motor permanently—that is, the operator will be unable to start the motor 12 without dismantling the grinder. The overspeed governor comprises in general, a pair of fly-weights 16 movable on a plane perpendicular to the plane of movement to the weights 13, or in other words, movable in a horizontal plane (as viewed in Figure 1), and which releasably engage springs 17 adapted, when released, to move the valve 15 into the closed position.

In furtherance to this end, a pair of wings 44 arranged in a diametrical fashion with respect to the axis, or rotor 18, of the motor 12, project outwardly from the plates 34. The fly-weights 16 are pivoted at their ends on pins 45 extending through the wings 44; and in the other end portions of the fly-weights 16 are holes 46 through which are hooked the ends of helical springs 47. The springs 47 extend perpendicularly through the plates 34—holes 134 are provided in the plates 34 to permit this arrangement—and are pinned at their other ends to the most distant plate 35.

Arranged in this fashion, the springs 47 tend to hold projections 51, on the free ends of the weights 16, against the sides of the vertical plates 34 to prevent the release of the springs 17 arranged outside of the plates 34 and having their hooked ends engaged by the projections 51. The springs 17, formed from a resilient wire, extend in bowed fashion over the weights 16 and parallel to and alongside the vertical plates 34, and curl about the head ends of the pins 37 and the ends are turned into holes 48 provided in the side of the wings 44 to limit the movement of springs on the pins 37. The opposite, or hooked, end portion 52 of each of these springs 17 are L-shaped with the vertical leg of the L extending downwardly, as viewed in Figure 4, so that the projection 51 lies within the angle formed by said portion 52 of the spring 17. In other words, the spring 17 extends above the weight 16 along substantially its entire length, then turns downwardly parallel and adjacent to the inner edge of the projection 51, and then the extreme end of said portion 52 is turned under and bears against the lower surface of the projection 51 adjacent the free end thereof. With this arrangement, slight movement of the projection 51 away from the plate 34 will release the spring 17; that is, the resistance of the spring 17 to sidewise movement will overcome the tendency of the spring to swing out with the weight 16, and the projection will move clear of the hooked end of the spring 17.

In order to limit the outward movement of the weights 16, and thereby preclude stretching the spring 47 beyond its elastic limit and also to prevent the weights 16 from swinging out and striking the wall of the member 29, a stop is provided to halt such movement after the projection 51 releases the spring 17. Specifically this stop comprises a pin 53 press-fitted in the weight 16 and extending radially from the lower surface thereof into a hole 54 formed in the wing 44. The location and size of the hole 54 is such that the degree of arc through which the projection 51 may travel before the pin 53 strikes the outer edge surface of the hole 54 and halts the outward movement of the weight 16, will assure that the spring 17 will be released before the weight 16 reaches this outer limiting position.

The springs 17 are arranged so that when they are engaged by the fly-weights 16, they are in a compressed state and in the released position they move upwardly to actuate the pin 14 to close the valve 15. Thus, whenever the fly-weights 16 swing outwardly, with respect to the head 39, the projections 51 move clear of the hooked ends of the springs 17 thereby releasing the springs 17 and the bowed portions thereof tend to straighten and hence move upwardly (as viewed in Figure 1) to actuate the pin 14. In furtherance to this end, a circular plate 49 lying in a plane perpendicular to the movement of the springs 17 is adapted to the lower end portion of the pin 14, thus a large surface area is presented against which the springs 17 strike upon release by the weights 16. It is also to be noted, that in order to eliminate the possibility of the springs 17 striking the plate 49 and then slipping clear, the marginal portion of the plate 49 is turned downwardly, as viewed in Figure 4, and that the springs 17, by virtue of their construction, make contact with the plate near the center thereof. (See Fig. 4.)

Reviewing briefly the operation of the grinder provided with a preferred form of the safety device, compressed air is supplied to the motor 12 through the passage 32 by turning the manually operated valve 50 in the handle 28 into the open position. Compressed air passes from the passage 32 through the inlet port 21 and expands in the motor 12 thereby rotating the vanes 19 and thence is exhausted from the motor 12 through the ports 22 to the atmosphere.

With the valve 50 in full open position the speed of the motor 12 is maintained at a relative constant value by the action of the speed governor. Specifically, when the speed of the motor—and hence the rotary speed, in a horizontal plane, of the fly-weights 13 and 16—reaches some predetermined value, the fly-weights 13 are moved outwardly under the influence of centrifugal force thereby lifting the rod 40 which movement is transmitted through the pin 14 to the valve 15 thereby diminishing the supply of pressure fluid to the motor 12.

In the event of faulty operation of the speed governor, when the motor 12 reaches some predetermined speed—this speed being somewhat higher than the value at which the fly-weights 13 are moved outwardly—the fly-weights 16 will be swung outwardly by centrifugal force thereby releasing the springs 17 which snap upwardly (as viewed in Figure 1) striking the plate 49 and moving the valve 15 into the closed position to shut down the motor 12. In order to reset the springs 17 it is necessary to dismantle the grinder and manually hook the ends of the springs 17 over the free ends of the fly-weights. Accordingly, it is impossible for the operator to purposely or inadvertently operate the grinder with a faulty speed governor without first dismantling the tool, at which time the speed governor may be repaired.

In view of the foregoing disclosure it becomes apparent that a safety device constructed in accordance with the practice of the invention accompilshes among others the object hereinbefore stated. It is further to be noted that such a safety device is not only simple in construction and, therefore, less likely to fall into disrepair, but it is also extremely compact in its arrangement of parts and, therefore, readily adaptable to a great variety of rotary tools without materially increasing their bulk.

While I have shown and described a specific form of my invention it is to be understood that various changes and modifications may be made without departing from the spirit of the invention as set forth in the appended claims.

I claim:

1. A safety device for a rotary motor, comprising a valve for controlling the flow of power to the motor, a governor for controlling the speed of said motor by actuating said valve to control the flow of power to the motor, a spring arranged to act in the released position to close said valve, and a speed responsive element releasably engaging said spring to place the spring under stress and acting at a predetermined speed of said motor to release said spring.

2. A safety device for a motor, comprising a valve for controlling the supply of power to the motor, a mounting on the axis of said motor and rotatable therewith, two sets of fly-weights on said mounting, a pin for transmitting the movement of one set of fly-weights to actuate said valve for governing the speed of the motor, and a resilient member under stress releasably engaged by the other set of fly-weights and arranged to act in its released position to actuate said pin for shutting down the motor.

3. A safety device for rotary motors, comprising a valve for controlling the supply of power to the motor, a set of fly-weights moving in response to the speed of the motor for actuating said valve, a resilient member arranged to move said valve into the closed position, and a second set of fly-weights releasably engaging said member to place the member under stress against such movement and movable in a plane perpendicular to the plane of movement of the first said weights to release said member at a predetermined speed of the motor.

4. A safety device for a rotary tool having a housing with a fluid actuated motor at one end thereof, comprising a reciprocating valve in the other end of the housing, a mounting on the axis of said motor between the valve and the motor, a governor on the mounting for actuating said valve to control the speed of the motor, a resilient member on said mounting and adapted to move said valve into the closed position, and an element on said mounting releasably engaging said member to prevent closing of the valve thereby and movable in response to a predetermined speed of the motor to release said member to permit closing of the valve.

WILLIAM R. MACLAY.

REFERENCES CITED

The following references are of record in the file of this patent:

UNITED STATES PATENTS

| Number | Name | Date |
|---|---|---|
| 1,213,791 | Bailey | Jan. 23, 1917 |
| 2,422,733 | Jimerson | June 24, 1947 |